(12) United States Patent
Matsuyama et al.

(10) Patent No.: US 10,724,489 B2
(45) Date of Patent: Jul. 28, 2020

(54) ENGINE-GENERATOR STARTING APPARATUS

(71) Applicant: Honda Motor Co., Ltd., Tokyo (JP)

(72) Inventors: Wataru Matsuyama, Wako (JP); Yuichi Onoe, Wako (JP); Tetsuya Matsuhisa, Wako (JP); Kenji Shibata, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/264,348

(22) Filed: Jan. 31, 2019

(65) Prior Publication Data

US 2019/0242351 A1    Aug. 8, 2019

(30) Foreign Application Priority Data

Feb. 8, 2018  (JP) .................................. 2018-020876

(51) Int. Cl.
| | | |
|---|---|---|
| *F02N 11/04* | (2006.01) | |
| *F02N 11/08* | (2006.01) | |
| *F02N 19/00* | (2010.01) | |
| *H02P 27/06* | (2006.01) | |
| *H02M 5/458* | (2006.01) | |

(52) U.S. Cl.
CPC .......... *F02N 11/04* (2013.01); *F02N 11/0862* (2013.01); *F02N 19/005* (2013.01); *H02P 27/06* (2013.01); *F02N 2011/0896* (2013.01); *F02N 2019/008* (2013.01); *H02M 5/4585* (2013.01)

(58) Field of Classification Search
CPC .... F02N 11/04; F02N 11/0862; F02N 19/005; F02N 2011/0896; F02N 2019/008
See application file for complete search history.

(56) References Cited

U.S. PATENT DOCUMENTS

| | | | | |
|---|---|---|---|---|
| 5,020,506 A | * | 6/1991 | Ozawa ..................... | F02P 1/086 123/631 |
| 9,086,044 B2 | | 7/2015 | Hashimoto et al. | |
| 2003/0140881 A1 | * | 7/2003 | Makajima ............... | F02B 61/02 123/179.3 |
| 2007/0204827 A1 | * | 9/2007 | Kishibata ................ | F02N 11/08 123/179.5 |

(Continued)

FOREIGN PATENT DOCUMENTS

JP          2012241562 A       12/2012

*Primary Examiner* — Thomas N Moulis
(74) *Attorney, Agent, or Firm* — Duft & Bornsen, PC

(57) ABSTRACT

An engine-generator starting apparatus a three-phase winding equipped with a generating unit that rotates relative to rotation of a crankshaft of an engine, and an electronic control unit that controls supply of electric current the three-phase winding to rotate the crankshaft and start the engine. In the apparatus, the electronic control unit controls to supply first current to the three-phase winding to make the engine crankshaft of rotate reverse, the first current is of a level for stopping the piston connected to the crankshaft at a position in a compression stroke. Then it controls to supply second current (that is greater than the first current) to the three-phase winding to make the crankshaft of the engine rotate forward when a predetermined time period has elapsed, and control to ignite fuel supplied to the engine after the second current is supplied to the three-phase winding.

13 Claims, 3 Drawing Sheets

(56) References Cited

U.S. PATENT DOCUMENTS

| | | | | |
|---|---|---|---|---|
| 2008/0105230 A1* | 5/2008 | Kishibata | ............ | F02D 41/062 123/179.5 |
| 2008/0201064 A1* | 8/2008 | DiGonis | ............... | B60W 10/06 701/110 |
| 2009/0020100 A1* | 1/2009 | Sakaigaki | ............. | F02D 41/009 123/350 |
| 2017/0067407 A1* | 3/2017 | Dudar | .................... | F02D 41/08 |

\* cited by examiner

ENGINE-GENERATOR STARTING APPARATUS

CROSS-REFERENCE TO RELATED APPLICATION

This application is based upon and claims the benefit of priority from Japanese Patent Application No. 2018-020876 filed on Feb. 8, 2018, the contents of which are incorporated herein by reference.

BACKGROUND OF THE INVENTION

Field of the Invention

This invention relates to an engine-generator starting apparatus.

Japanese Unexamined Patent Application No. 2012-241562A describes known technology regarding an engine-generator, e.g., an inverter generator, for generating electric power using output of an output winding of a power generating unit driven by an internal combustion engine. The engine-generator starting apparatus of the reference is equipped with a starter-generator-driver, and engine starting is controlled through this starter-generator-driver.

In the technology of the reference, when the piston position of the engine is ahead of compression stroke including top dead center (TDC), driving torque required for moving beyond compression stroke is obtained by setting an increase of prescribed value in initial current value supplied through the starter-generator-driver to the output winding for driving the starter-generator. Increasing current value in this manner reliably enables engine starting even when the engine piston position is ahead of compression stroke.

A point requiring attention with regard to a starter-generator is that when starter-generator drive current value is increased in order to move past the first compression stroke where great torque is required, especially in a configuration without a crankshaft position sensor, sudden rise in current value leads to loss of motor rotation control capability, namely to so-called step-out. And step-out is apt to produce device damaging motor current spikes.

SUMMARY OF THE INVENTION

An object of this invention is therefore overcome the aforesaid problem by providing an engine-generator starting apparatus, particularly an engine-generator starting apparatus that enables a piston to reliably move beyond the compression stroke without increasing current value.

In order to achieve the object, the present invention provides in its first aspect an apparatus for starting engine generator having a three-phase winding equipped with a generating unit that rotates relative to rotation of a crankshaft of an engine, an inverter unit that converts alternating current outputted from the generating unit to alternating current in predetermined frequency and outputs to a load, and an electronic control unit that controls supply of electric current outputted from the inverter unit to the three-phase winding of the generating unit to rotate the crankshaft and start the engine; wherein the improvement comprises: the electronic control unit is configured to have; a first current control unit that supplies first current to the three-phase winding to make the crankshaft of the engine rotate reverse, the first current being of a level for stopping the piston connected to the crankshaft at a position in a compression stroke; a second current control unit that determines whether a predetermined time period has elapsed and supplies second current to the three-phase winding to make the crankshaft of the engine rotate forward when it is determined that the predetermined time period has elapsed, the second current being greater than the first current; and an ignition control unit that ignites fuel supplied to the engine after the second current control unit supplies the second current to the three-phase winding.

In order to achieve the object, the present invention provides in its second aspect a method for starting an engine-generator having a three-phase winding equipped with a generating unit that rotates relative to a crankshaft of an engine, and an inverter unit that converts alternating current outputted from the generating unit to alternating current in predetermined frequency and outputs to a load, so that the engine is started by controlling supply of electric current from the inverter unit to the three-phase winding of the generating unit so as to rotate the crankshaft, wherein the improvement comprises the steps of: supplying first current to the three-phase winding to make the crankshaft of the engine rotate reverse, the first current being of a level for stopping the piston connected to the crankshaft at a position in a compression stroke; determining whether a predetermined time period has elapsed and supplying second current to the three-phase winding to make the crankshaft of the engine to rotate forward, when it is determined that the predetermined time period has elapsed, the second current being greater than the first current; and igniting fuel supplied to the engine after the second current is supplied to the three-phase winding.

In order to achieve the object, the present invention provides in its third aspect an apparatus for starting engine generator having a three-phase winding equipped with a generating unit that rotates relative to rotation of a crankshaft of an engine, an inverter unit that converts alternating current outputted from the generating unit to alternating current in predetermined frequency and outputs to a load, and an electronic control unit that controls supply of electric current outputted from the inverter unit to the three-phase winding of the generating unit to rotate the crankshaft and start the engine; wherein the improvement comprises: the electronic control unit has at least one processor and a memory coupled to the processor; wherein the processor is configured to perform: supplying first current to the three-phase winding to make the crankshaft of the engine rotate reverse, the first current being of a level for stopping the piston connected to the crankshaft at a position in a compression stroke; determining whether a predetermined time period has elapsed and supplies second current to the three-phase winding to make the crankshaft of the engine rotate forward when it is determined that the predetermined time period has elapsed, the second current being greater than the first current; and igniting fuel supplied to the engine after the second current control unit supplies the second current to the three-phase winding.

DETAILED DESCRIPTION OF THE INVENTION

An embodiment of this invention is explained with reference to FIGS. 1 to 4 in the following. The starting apparatus according this embodiment of the invention is incorporated in a portable or mobile engine-generator of weight and size a user can carry by hand.

Figure 1:
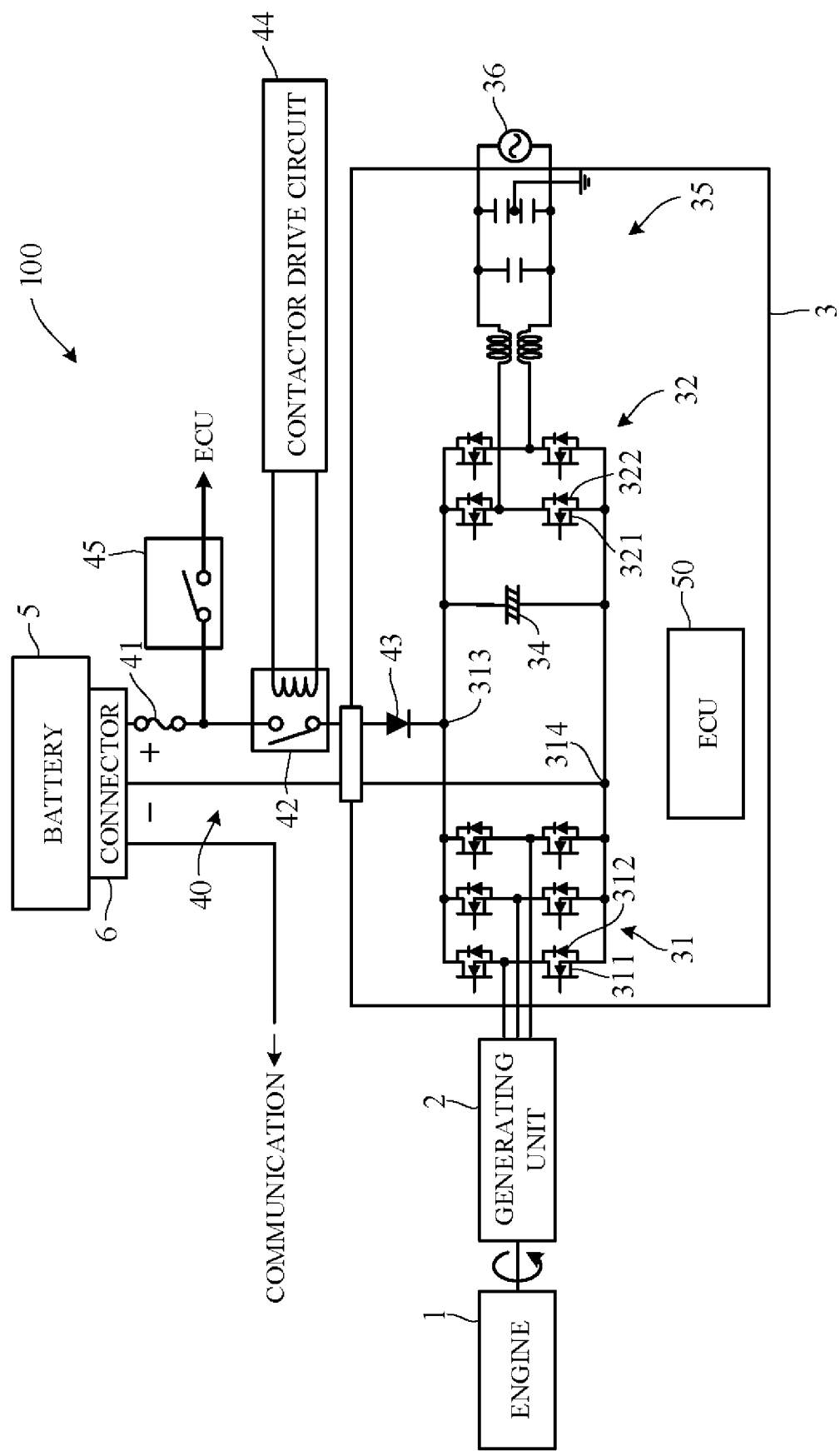
FIG. 1 an electrical circuit diagram illustrating overall configuration of an engine-generator starting apparatus according to an embodiment of this invention.
Figure 2:
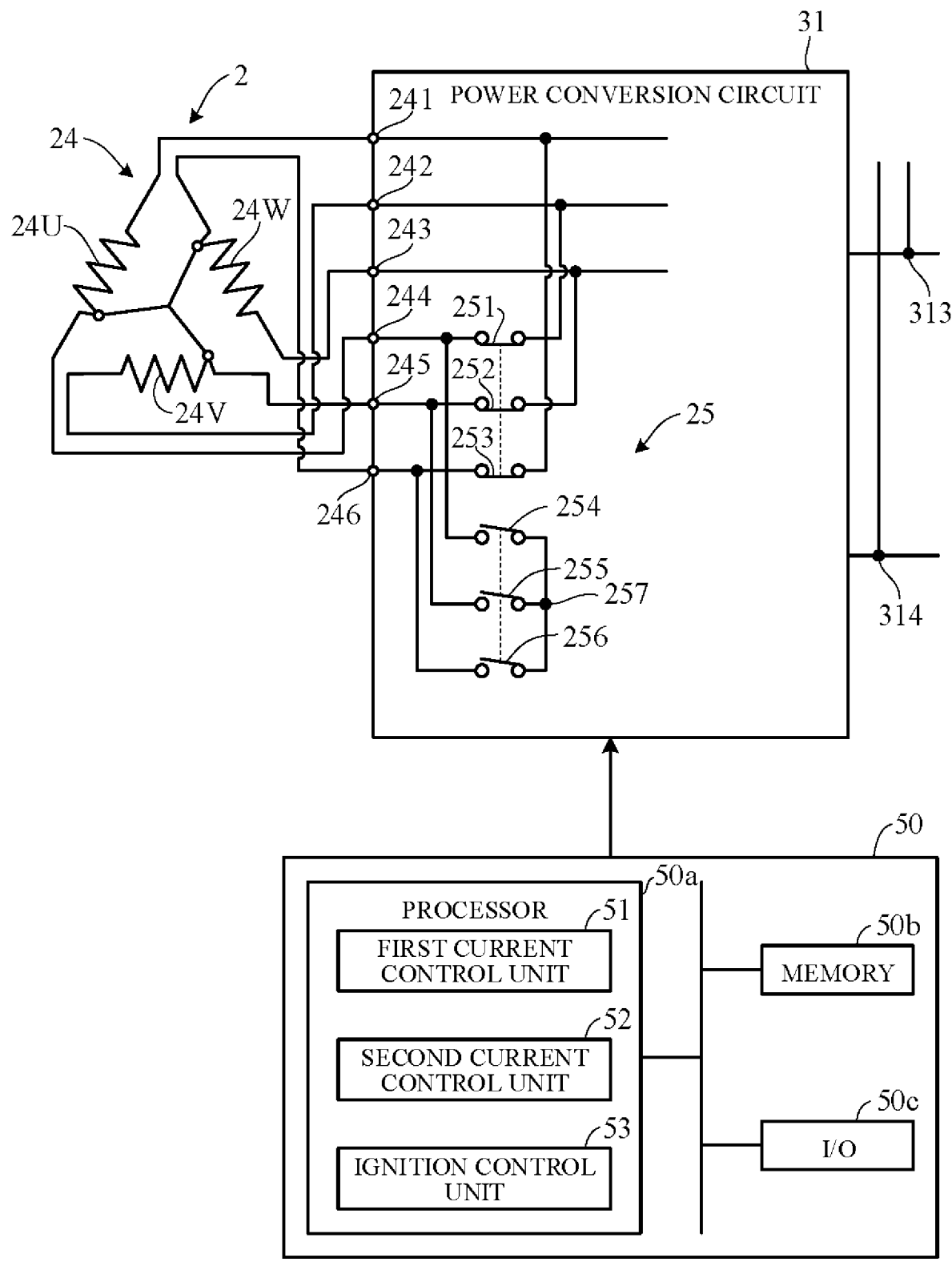
FIG. 2 an electrical circuit diagram showing essential components of the engine-generator starting apparatus according to the embodiment of this invention.

FIG. 1 is an electrical circuit diagram illustrating overall configuration of an engine-generator starting apparatus 100 according to an embodiment of this invention, and FIG. 2 is an electrical circuit diagram showing essential components of the engine-generator starting apparatus 100. As shown in FIG. 1, the starting apparatus 100 comprises an internal combustion engine 1, a generating unit 2 driven by the engine 1, and an inverter unit 3 electrically connected to the generating unit 2.

The engine 1 is, for example, a spark ignition, air cooled, gasoline fueled one-cylinder four-stroke engine with a piston that reciprocates inside a cylinder and a crankshaft (output shaft) that rotates synchronously with the piston. Motive power of the engine 1 is outputted through the crankshaft to the generating unit 2. The engine 2 is a multi-purpose engine most suitable for agriculture, outdoor lives.

The generating unit (generator main body) 2 comprises a multipolar alternator driven by the engine 1 to generate AC power. It comprises a rotor connected to and rotated integrally with the crankshaft and a stator arranged concentric with the rotor to face a peripheral surface thereof. The rotor is provided with permanent magnets. The stator is provided with UVW three-phase windings arranged at phase angle differences of 120 degree. The generating unit 2 can function as a starter motor by power provided from a battery 5, in which case the engine 1 can be started by the generating unit 2 without using a recoil starter.

The inverter unit (inverter circuit) 3 comprises a power conversion circuit 31 that rectifies three-phase AC current output by the generating unit 2, an inverter 32 that converts DC current outputted from the power conversion circuit 31 to prescribed single-phase AC current, and an electronic control unit (ECU) 50 that controls the power conversion circuit 31 and the inverter 32. The ECU 50 is constituted as a microcomputer having at least a processor (CPU) 50a, a memory (ROM, RAM) 50b coupled to the processor, I/O 50c and other peripheral circuits and the like.

The power conversion circuit 31 is configured as a bridge circuit comprising three pairs of (total of six) transistor switching elements 311 connected one pair in association with each of the U-phase, V-phase and W-phase windings of the generating unit 2. The switching elements 311 are constituted of, for example, MOSFET, IGBT or other type transistors, and a diode 312 (e.g., parasitic diode) is connected in parallel with each of the switching elements 311.

A gate of each switching element 311 is driven by a control signal outputted from the ECU 50, and ON-OFF switching of the switching elements 311 is controlled by the ECU 50. For example, when the generating unit 2 functions as a generator, the switching elements 311 are turned OFF, so that three-phase AC is rectified by the diodes 312. The rectified current is smoothed by a capacitor 34 and inputted to the inverter 32. When the generating unit 2 functions as a starter motor, the power conversion circuit 31 ON-OFF controls the switching elements 311 to convert DC supplied from the battery 5 to three-phase AC for output to the generating unit 2.

The inverter 32 comprises two pairs of (total of four) transistor switching elements 321 configured as an H-bridge circuit. The switching elements 321 are constituted of, for example, MOSFET, IGBT or other type transistors, and a diode 322 (e.g., parasitic diode) is connected in parallel with each of the switching elements 321. A gate of each switching element 321 is driven by a control signal outputted from the ECU 50, and ON-OFF switching of the switching elements 321 is controlled by the ECU 50 so as to convert DC to single-phase AC. The single-phase AC obtained from the inverter 32 is sinusoidally modulated by passage through a filter circuit 35 having a reactor and a capacitor, and outputted to an electric load 36

The battery 5 is electrically connected to the inverter unit 3 through a power supply circuit 40. The power supply circuit 40 is installed so as to connect the battery 5 through a connector 6 to between the power conversion circuit 31 and the capacitor 34, i.e., to positive side and negative side output terminals 313 and 314 of the power conversion circuit 31. More specifically, a positive side terminal of the battery 5 is connected to the positive side output terminal 313 of the power conversion circuit 31 through a fuse 41, a contactor 42 and a diode 43, and a negative side terminal thereof is connected to a minus side output terminal 314 of the power conversion circuit 31.

The contactor 42 includes a switch that electrically connects (ON) and disconnects (OFF) the battery 5 to and from the inverter unit 3, and its ON-OFF operation is controlled by a contactor drive circuit 44. A battery switch 45 is connected between the fuse 41 and the contactor 42, and power is supplied to the ECU 50 by turning the battery switch 45 ON. This causes the contactor drive circuit 44 to turn the contactor 42 ON. When the battery switch 45 is turned OFF, the contactor drive circuit 44 turns the contactor 42 OFF. In other words, the contactor 42 is turned ON and OFF conjointly with ON-OFF operation of the battery switch 45.

When the user turns the battery switch 45 ON, the engine 1 is to be started by power outputted from the battery 5. This turns the contactor 42 ON, and power of the battery 5 is supplied to the power conversion circuit 31. At this time, the ECU 50 determines whether the battery switch 45 is made ON, and when it determines the battery switch 45 to be ON, it ON-OFF controls the switching elements 311 of the power conversion circuit 31 to convert DC power to AC power. The resulting AC power is supplied to the generating unit 2, so that a revolving magnetic field is produced in a stator winding 24 and a rotor 21 of the generating unit 2 rotates. As a result, the crankshaft is rotated and the engine 1 can be started by cranking. A communication line is connected to the connector 6, and internal temperature, charge state and other battery 5 data are transmitted through this communication line to the ECU 50.

As shown in FIG. 2, the generating unit 2 is configured to have a three-phase winding 24. The three-phase winding 24 wound on the stator comprises a U-phase winding 24U, a V-phase winding 24V and a W-phase winding 24W. The U, V and W windings 24 are configured in a 120-degree circumferentially spaced Y-connection.

One end terminals 241 to 243 of the windings 24U, 24V and 24W are connected to the switching elements 311 and the diodes 312 of the power conversion circuit 31 of FIG. 1. Other end terminals 244 to 246 of the windings 24U, 24V and 24W are connected to a switching circuit 25.

The switching circuit 25 is provided between the generating unit 2 and the power conversion circuit 31 and is implemented on the inverter unit 3. More specifically, the switching circuit 25 comprises a switch 251 whose one end is connected to the terminal 244 and other end is connected to the terminal 242, a switch 252 whose one end is connected to the terminal 245 and other end is connected to the terminal 243, a switch 253 whose one end is connected to the terminal 246 and other end is connected to the terminal 241, and switches 254 to 256 whose one ends are connected to the terminals 244 to 246, respectively, and other ends are connected together through a neutral point 257. The switches 251 to 256 are configured, for example, as relay switches that are opened and closed (turned ON and OFF) by energizing and de-energizing coils.

The switches 251 to 256 are opened and closed, i.e., their coils are energized and de-energized, by control signals from the ECU 50. Where the switches 251 to 253 are defined as a first switch group and the switches 254 to 256 as a second switch group, the ECU 50 outputs control signals to simultaneously turn ON the switches 251 to 253 of the first switch group and simultaneously turn OFF the switches 254 to 256 of the second switch group, or to simultaneously turn OFF the switches 251 to 253 of the first switch group and simultaneously turn ON the switches 254 to 256 of the second switch group.

The ECU 50 includes a first current control unit 51, second current control unit 52, and an ignition control unit 53. The first current control unit 51 supplies the winding 24 with crankshaft reverse-rotating first current of a level (e.g., about 5 A) sufficient to stop the piston connected to the crankshaft at a position in a compression stroke, preferably immediately after TDC.

Figure 4:
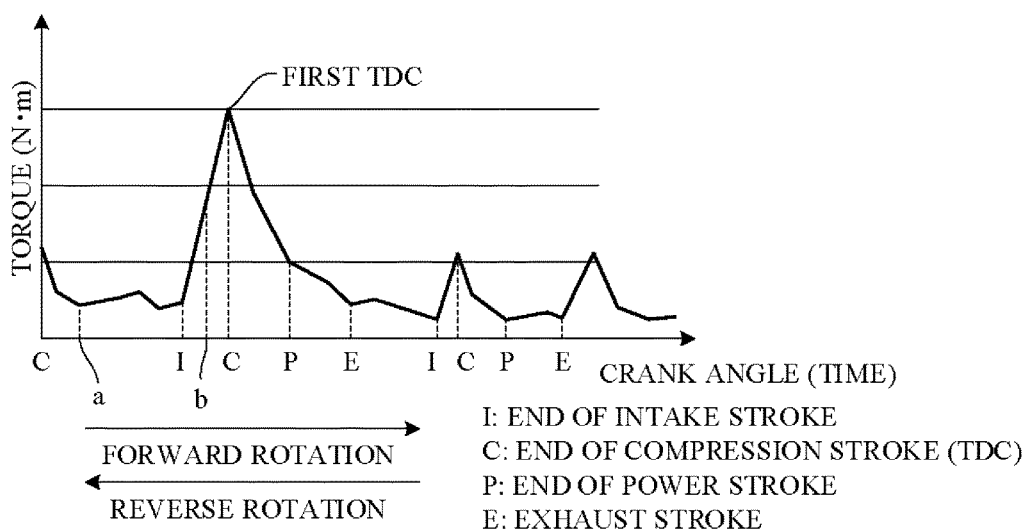
FIG. 4 is a diagram showing crankshaft torque change during engine starting.

FIG. 4 is a diagram showing crankshaft torque change with respect to crank angles during engine starting. In the figure, "I", "C", "P" and "E" indicate each end of an intake stroke, compression stroke, power stroke and exhaust stroke of operating cycle of the engine 1. The situation is assumed to be at crank angle "a" or "b" to move the piston towards the first TDC so as to start the engine 1.

In the embodiment, during starting of the four-stroke engine, the crankshaft is reverse-rotated to a position in the compression stroke, preferably to a position immediately after the end of compression stroke (TDC) in the preceding cycle (leftest one in the figure). Specifically, the first current is set to a value smaller than current value necessary to produce torque needed to move the piston beyond compression stroke and TDC, so as to be kept at the position in the compression stroke, as will be explained gain with reference to FIG. 4.

In the embodiment, at a predetermined time period following supply of the first current to the winding 24 by the first current control unit 51, the second current control unit 52 supplies crankshaft forward-rotating second current greater than the first current (e.g., about 20 A) to the three-phase winding 24. Then, after elapse of a time period needed to reverse-rotate the piston to a position at the compression stroke in preceding (and earlier compression strokes), the piston is enabled to move beyond the compression stoke and TDC by controlling the second current to a value that produces torque capable of moving the piston beyond compression stroke including the first TDC.

The ignition control unit 53 controls ignition in a cylinder combustion chamber. Specifically, the ignition control unit 53 controls timing of ignition by a spark plug so as to ignite fuel supplied to the engine 1 after supply of the second current to the three-phase winding 24.

When the generating unit 2 is driven as a motor, the three-phase winding 24 generates a magnetic field upon being supplied with DC voltage. The rotor 21 of the generating unit 2 rotates owing to the generated magnetic field, whereby the generating unit 2 can drive the engine 1 as a starter motor.

Figure 3:
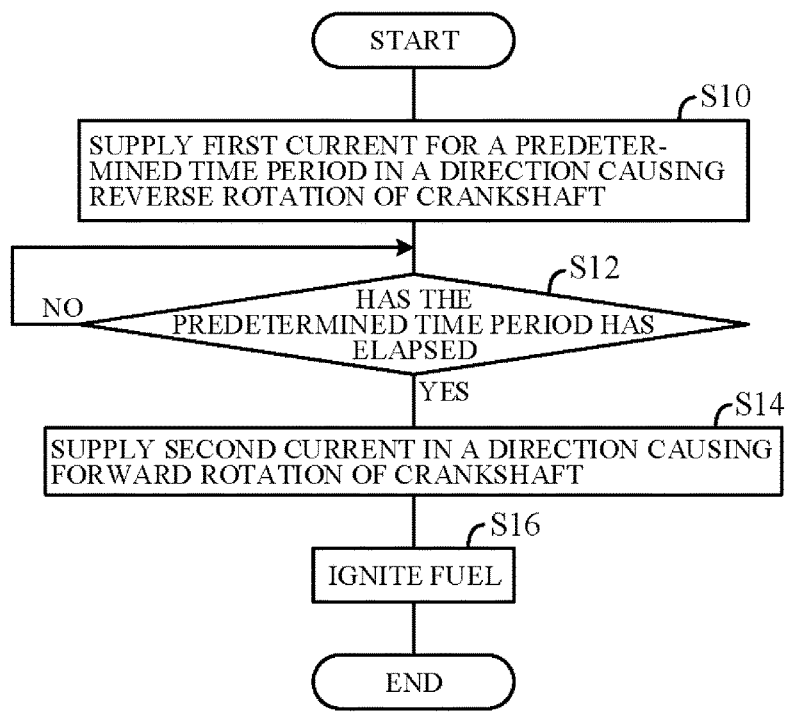
FIG. 3 is a flowchart showing processing performed by the electronic control unit of FIG. 1.

FIG. 3 is a flowchart showing processing performed by the ECU 50 mentioned above. The processing of the illustrated flowchart starts when the user turns on a switch to start the engine 1 and is periodically executed at predetermined time intervals (n) of, for example, 1 sec.

First, in S10 (S: processing Step), the first current is supplied in response to an engine start switch for a predetermined time period in a direction causing reverse rotation of the crankshaft. Namely, first current of a level that stops the piston (not shown) connected to the crankshaft at a position in the compression stroke, preferably immediately after TDC is supplied to the three-phase winding 24 to rotate the crankshaft in reverse.

Next, in S12, it is determined whether the predetermined time period elapsed, i.e., whether a predetermined time period has passed (elapsed) after the first current was supplied to the three-phase winding 24. When the result in S12 is YES, i.e., it is considered that the predetermined time period has passed since the supply of the first current, and the program therefore goes to S14. In S14, the second current is supplied in the direction causing forward rotation of the crankshaft.

Next, in S16, control of fuel ignition in the cylinder combustion chamber is performed to start the engine 1.

As shown in FIG. 4, torque required to start the engine 1 becomes maximum when the piston passes TDC for the first time in the start. A phenomenon of piston reversal therefore arises owing to insufficient torque.

This embodiment deals with this problem by applying current in direction of reverse crankshaft rotation for a predetermined time period so as to move the piston back to its position at a position in the compression stroke, preferably at a position immediately after TDC in the preceding cycle and thus lengthen run-up period to compression top dead center in current cycle, thereby ensuring reliable passage beyond compression top dead center.

To explain in further detail, the crankshaft is reverse-rotated to a position at the compression stroke (preferably immediately after TDC) in the preceding cycle the piston. With this, since the crankshaft is thereafter forward-rotated by the second current that produces torque sufficient to move the piston beyond (pass) compression stroke and TDC, when it is assumed that the movement begins at crank angle "a" in the figure, run-up distance is adequately lengthened to enable the piston to easily move beyond the compression stroke and TDC. In other words, when it is assumed that the movement begins at crank angle "b" in the figure, the piston can be reliably move beyond compression stoke including TDC compared with a case of there being no run-up period exists.

As set out in the foregoing, this embodiment is configured to have an apparatus (100) for starting an engine-generator having a three-phase winding (24) equipped with a generating unit (2) that rotates relative to rotation of a crankshaft of an engine (1), an inverter unit (3) that converts alternating current outputted from the generating unit to alternating current in predetermined frequency and outputs to a load, and an ECU (50) that controls supply of electric current outputted from the inverter unit (3) to the three-phase winding (24) of the generating unit (2) to rotate the crankshaft and start the engine (1); wherein the improvement comprises: the ECU (50) is configured to have; a first current control unit (51) that supplies first current to the three-phase winding (24) to make the crankshaft of the engine rotate reverse, the first current being of a level for stopping the piston connected to the crankshaft at a position in the compression stroke; a second current control unit (52) that determines whether a predetermined time period has elapsed and supplies second current to the three-phase winding (24) to make the crankshaft of the engine rotate forward when it is determined that the predetermined time period has elapsed, the second current being greater than the first current; and an ignition control unit (53) that ignites fuel supplied to the engine (1) after the second current control unit (52) supplies the second current to the three-phase winding (24).

Similarly, this embodiment is configured to have an apparatus (100) for starting engine-generator having a three-phase winding (24) equipped with a generating unit (2) that rotates relative to rotation of a crankshaft of an engine (1), an inverter unit (3) that converts alternating current outputted from the generating unit to alternating current in predetermined frequency and outputs to a load, and an ECU (50) that controls supply of electric current outputted from the inverter unit (3) to the three-phase winding (24) of the generating unit (2) to rotate the crankshaft and start the engine (1); wherein the improvement comprises: the ECU (50) has at least one processor and a memory coupled to the processor; wherein the processor is configured to perform: supplying first current to the three-phase winding (24) to make the crankshaft of the engine rotate reverse, the first current being of a level for stopping the piston connected to the crankshaft at a position in the compression stroke (S10); determining whether a predetermined time period has elapsed and supplies second current to the three-phase winding (24) to make the crankshaft of the engine rotate forward when it is determined that the predetermined time period has elapsed, the second current being greater than the first current (S12, S14); and igniting fuel supplied to the engine (1) after the second current control unit (52) supplies the second current to the three-phase winding (S16).

So the crankshaft is once reverse-rotated from its stopped position in order to lengthen run-up period to the compression stroke and TDC and thus gather momentum for moving beyond the compression stroke and TDC, whereby step-out can be prevented and stable starting of the engine 1 can be achieved.

Moreover, it is configured such that the first current is of smaller value than needed to produce torque sufficient to move the piston beyond the compression stroke including TDC and the second current is of a value that produces torque capable of moving the piston beyond the compression stroke and TDC. With this, notwithstanding that the crankshaft is reversely rotated, the reverse rotation stops at a rotation angle in the compression stroke of the preceding cycle, and when the crankshaft rotates forward, it is rotated to a rotation angle immediately pass the compression stroke and TDC without fail. Reliable movement beyond the compression stroke is therefore ensured.

Further, it is configured such that the aforesaid predetermined time period is defined as time period needed to reverse-rotate the crankshaft to stop the piston at the position in the compression stroke in the preceding and earlier cycles. With this, the crankshaft can be reliably rotated to a rotation angle at the compression stroke of the preceding cycle.

Further, it is configured such that the inverter unit (3) is electrically connected to a battery (5), and the ECU (50) converts DC power to AC power outputted from the battery through the inverter unit and supplies the AC power to the generating unit. With this, stable starting of the engine 1 can be achieved, without increasing current value and causing step-out Further, it is configured such that the engine (1) comprises a multi-purpose engine. With this, stable starting of the multi-purpose engine can be achieved.

Furthermore, as explained in the foregoing, this embodiment is configured to have a method of starting the engine-generator having a three-phase winding (24) equipped with a generating unit (2) that rotates relative to a crankshaft of an engine (1), and an inverter unit (3) that converts alternating current outputted from the generating unit to alternating current in predetermined frequency and outputs to a load, so that the engine (1) is started by controlling supply of electric current from the inverter unit (3) to the three-phase winding (24) of the generating unit (2) so as to rotate the crankshaft, wherein the improvement comprises the steps of: supplying first current to the three-phase winding to make the crankshaft of the engine rotate reverse, the first current being of a level for stopping the piston connected to the crankshaft at a position in a compression stroke (S10); determining whether a predetermined time period has elapsed and supplying second current to the three-phase winding to make the crankshaft of the engine to rotate forward, when it is determined that the predetermined time period has elapsed, the second current being greater than the first current (S12, S14); and igniting fuel supplied to the engine after the second current is supplied to the three-phase winding (S16).

As a configuration is thus adopted whereby the crankshaft is once reverse-rotated from its stopped position in order to lengthen run-up period to compression top dead center and thus gather momentum for moving beyond compression stroke, whereby step-out can be prevented and stable starting of the engine 1 can be achieved, without increasing current value.

Moreover, it is configured such that the first current is of smaller value than needed to produce torque sufficient to move the piston beyond the compression stroke and the second current is of a value that produces torque capable of moving the piston beyond compression stroke, so that notwithstanding that the crankshaft is reversely rotated, the reverse rotation stops at a rotation angle in the compression stroke, preferably immediately after the TDC of the preceding cycle, and when the crankshaft rotates forward, it is rotated to a rotation angle beyond the compression stroke and TDC without fail. Reliable movement beyond the compression stroke is therefore ensured.

Further, it is configured such that the aforesaid predetermined time period is defined as time period needed to reverse-rotate the crankshaft to stop the piston at a position in the compression stroke in the preceding and earlier cycles. With this, the crankshaft can be reliably rotated to a rotation angle after the compression stroke of the preceding cycle.

Although the foregoing description was made with respect to a four-stroke engine that repeatedly performs an intake stroke, compression stroke, power stroke and exhaust stroke, the advantages and effects of the present application can be achieved also with respect to a two-stroke engine.

While the present invention has been described with reference to the preferred embodiments thereof, it will be understood, by those skilled in the art, that various changes and modifications may be made without departing from the scope of the appended claims.

What is claimed is:

1. An apparatus for a starting engine generator having a three-phase winding equipped with a generating unit that rotates relative to rotation of a crankshaft of an engine, an inverter unit that converts alternating current outputted from the generating unit to alternating current in a predetermined frequency and outputs to a load, and an electronic control unit that controls a supply of electric current outputted from the inverter unit to the three-phase winding of the generating unit to rotate the crankshaft and start the engine;

wherein the improvement comprises:
the electronic control unit is configured to have;
a first current control unit that supplies first current to the three-phase winding to make the crankshaft of the engine rotate in reverse, the first current being of a level for stopping the piston connected to the crankshaft at a position in a compression stroke;
a second current control unit that determines whether a predetermined time period has elapsed and supplies second current to the three-phase winding to make the crankshaft of the engine rotate forward when it is determined that the predetermined time period has elapsed, the second current being greater than the first current; and
an ignition control unit that ignites fuel supplied to the engine after the second current control unit supplies the second current to the three-phase winding.

2. The apparatus according to claim 1, wherein the first current is of a smaller value than needed to produce torque sufficient to move the piston beyond the compression stroke and the second current is of a value that produces torque capable of moving the piston beyond the compression stroke.

3. The apparatus according to claim 1, wherein the predetermined time period is defined as a time period needed to reverse-rotate the crankshaft to stop the piston at the position in the compression stroke in the preceding and earlier cycles.

4. The apparatus according to claim 1, wherein the inverter unit is electrically connected to a battery, and the electronic control unit converts DC power to AC power outputted from the battery through the inverter unit and supplies the AC power to the generating unit.

5. The apparatus according to claim 1, wherein the engine comprises a multi-purpose engine.

6. A method for starting an engine-generator having a three-phase winding equipped with a generating unit that rotates relative to a crankshaft of an engine, and an inverter unit that converts alternating current outputted from the generating unit to alternating current in a predetermined frequency and outputs to a load, so that the engine is started by controlling a supply of electric current from the inverter unit to the three-phase winding of the generating unit so as to rotate the crankshaft, wherein the improvement comprises the steps of:
supplying first current to the three-phase winding to make the crankshaft of the engine rotate in reverse, the first current being of a level for stopping the piston connected to the crankshaft at a position in a compression stroke;
determining whether a predetermined time period has elapsed and supplying second current to the three-phase winding to make the crankshaft of the engine rotate forward, when it is determined that the predetermined time period has elapsed, the second current being greater than the first current; and
igniting fuel supplied to the engine after the second current is supplied to the three-phase winding.

7. The method according to claim 6, wherein the first current is of a smaller value than needed to produce torque sufficient to move the piston beyond the compression stroke and the second current is of a value that produces torque capable of moving the piston beyond the compression stroke.

8. The method according to claim 6, wherein the predetermined time period is defined as a time period needed to reverse-rotate the crankshaft to stop the piston at the position in the compression stroke in the preceding and earlier cycles.

9. An apparatus for a starting engine generator having a three-phase winding equipped with a generating unit that rotates relative to rotation of a crankshaft of an engine, an inverter unit that converts alternating current outputted from the generating unit to alternating current in a predetermined frequency and outputs to a load, and an electronic control unit that controls supply of electric current outputted from the inverter unit to the three-phase winding of the generating unit to rotate the crankshaft and start the engine;

wherein the improvement comprises:
the electronic control unit has at least one processor and a memory coupled to the processor;
wherein the processor is configured to perform:
supplying first current to the three-phase winding to make the crankshaft of the engine rotate in reverse, the first current being of a level for stopping the piston connected to the crankshaft at a position in a compression stroke;
determining whether a predetermined time period has elapsed and supplies second current to the three-phase winding to make the crankshaft of the engine rotate forward when it is determined that the predetermined time period has elapsed, the second current being greater than the first current; and
igniting fuel supplied to the engine after the second current is supplied to the three-phase winding.

10. The apparatus according to claim 9, wherein the first current is of a smaller value than needed to produce torque sufficient to move the piston beyond the compression stroke and the second current is of a value that produces torque capable of moving the piston beyond the compression stroke.

11. The apparatus according to claim 9, wherein the predetermined time period is defined as a time period needed to reverse-rotate the crankshaft to stop the piston at the position in the compression stroke in the preceding and earlier cycles.

12. The apparatus according to claim 9, wherein the inverter unit is electrically connected to a battery, and the electronic control unit converts DC power to AC power outputted from the battery through the inverter unit and supplies the AC power to the generating unit.

13. The apparatus according to claim 9, wherein the engine comprises a multi-purpose engine.

* * * * *